UNITED STATES PATENT OFFICE 2,587,591

COTTON FILLED STRUCTURAL MATERIAL AND PROCESS OF PREPARING THE SAME

Hibbard S. Busby and Wendell L. Ward, New Orleans, La., assignors to United States of America as represented by the Secretary of Agriculture No Drawing. Application July 11, 1950, Serial No. 173,222

4 Claims. (Cl. 260—17.4)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to preparation of a structural material from cotton fibers and a vinyl resin. It particularly relates to a method of processing in which the physical-chemical properties of the constituents are advantageously employed to obtain a product having the properties desired for use as a structural material.

In one aspect, the process initially comprises dispersing cotton fibers in an organic solvent to which is added a gelling or cross-linking agent and an oxidizing impellent, that is, a reaction propagating or polymerization catalyst. During mixing a marked swelling action takes place in the fiber. This swollen state of the fiber is maintained during the mixture with resin the dissolved resin being in intimate contact with the exposed surfaces of the fibers, and forces itself into surface interstices and upon the inner surfaces. The speed of stirring is kept below a rate which would shear, or inhibit, the gelling action of the resin. During this stirring stage the resin changes slowly to a progressively higher viscosity, which is preliminary to the subsequent thermosetting operation. The thermosetting is thereafter carried out by applying heat and pressure, after decanting surplus solvent.

The preferred solvents have a boiling point sufficiently high to insure that the heat treatment during the impregnation, prior to the thermosetting stage, does not cause appreciable loss of solvent.

The time of stirring of the filler and resin in the solvent-gelling mixture can be reduced to a short period of approximately 1 hour, if the temperature of the mixture is elevated to a point slightly below that of the boiling point of the lowest boiling member. In the case of a mixture of equal parts of methyl ethyl ketone and acetone, the maximum temperature is limited to 55° C.

The preferred solvent is a ketone or a mixture of ketones. Methyl ethyl ketone and acetone, in equal proportions, have been found to be one of the best mixtures for this purpose. Preferably, the cross-linking agent is a compatible diallyl structure such as diallyl maleate, although the diallyl adipate structure is useful also for production of products having more resilience.

Initiation of the molecular chain formation, or gelling action, is accomplished by means of an organic peroxide of good uniformity, dissolved in the mixture of solvents and bonding material. Benzoyl peroxide in the powder form was used effectively for this purpose.

It was found unnecessary to use any means, other than the gelling agent diallyl maleate or diallyl adipate, to propagate the jelling and cross-linking action. Termination of the reaction occurs as a thermoset condition during the application of combined pressure and heat at the end of the stirring or recirculation stage.

In order that full economic use may be made of the solvents, a recirculation method is employed, in which the soluble material remaining subsequent to completion of the stirring cycle, is driven backwards and forwards, in a closed system, through the filler mass, until a maximum of penetration into interstices and in contact with filler surfaces is achieved. This method may be used instead of the decanting method. When this is done greater mold pressures are required. Any residue of soluble material may then be reused for subsequent batches, by merely adding more solvent and gelling material, into which has been dissolved a balancing or compensating quantity of impellent, to reactivate the gelling action.

Although the procedures indicated above employed a vinyl copolymer type resin (Vinylite VYHH) having certain proportions of vinyl chloride and vinyl acetate, similar results were obtained when combinations of vinyl copolymer type resins (Vinylite VYHH and VYHF) were used, producing different ratios between the copolymer constituents and variable chloride content. The result sought is obtained when such resins, having different ratios of the copolymers, were used and their cross-linking limitations were supplemented by the use of adequate quantities of adapted cross-linking agents, proper impellent proportions, and temperature of mixing, followed by a heat and pressure cycle adjusted to the changed gelling conditions.

For best stability of finished product it is essential, after stirring is completed, that the mixture be decanted to remove the excess liquid from the mixture of fiber and liquid, and the small amount of residual liquid in the slurry be evaporated after it is placed in the molds on the press. A temperature of approximately 70° C. is best adapted to the evaporation of the small residue of these liquids. The temperature may be increased slowly until visual evidence of solvent disappears from the surface of the mixture. It may then be raised rapidly to 90° C. and maintained at not over 100° C., while pressure of not more than 350 p. s. i. is applied rapidly and maintained for twenty minutes. Upon removal from the mold the product exhibits a smooth, matt-white surface, is of uniform structure, and dimensionally stable. No post-cure cycle is necessary.

For continuous sheet production, ultimate roll pressures must exceed the static pressure named above. The most effective static pressure adapted to the formulation and processing cycle described was 350 p. s. i. Successive roll pressure stages must be used for continuous production of this material. Three stages of pressure, 250, 350, and 400 p. s. i. are so adapted. In continuous roller production the batch is stirred as before and then the solvent material is recirculated, thereupon the whole being dumped upon a screen belt (Fourdrinier, or similar type), thence being delivered to successive pairs of pressure rolls via a couch-roll system.

The following detailed examples illustrate the invention:

Example 1

| | Parts by weight |
|---|---|
| Methyl ethyl ketone | 25 |
| Acetone | 25 |
| Diallyl maleate | 10 |
| Benzoyl peroxide | 1 |
| Vinylite VYHH | 5 |
| Cotton fiber | 3 |

The cotton fiber is completely dispersed in the combination of solvents, gelling agents and impellent at room temperature. The resin is stirred in last, and stirring continued slowly until observation of the fibers under the microscope shows them to be markedly increased in bulk. At room temperature this usually takes several hours. When it is apparent that dissolved resin substantially covers the outer surfaces of the fibers and penetrates into their interstices, stirring is discontinued and the mixture decanted.

This slurry is placed in the mold, and the excess solvent is evaporated at not over 70° C. As soon as the surface of the slurry begins to gel, a pressure of 250 p. s. i. is applied, at the same time press temperature is elevated to approximately 95–100° C. The material is held in the mold for 15–20 minutes, or until the mold can be opened readily. The resultant product is a nearly chalk-white material of good dimensional stability and uniform composition.

Example 2

Example 2 varies from Example 1 only in that the stirring time is greatly reduced by elevating the temperature of the mixture to a point slightly below 55° C. while stirring for approximately one hour. The resultant product is approximately equivalent in all respects to Example 1.

Example 3

Example 3 varies from Example 2 in that instead of decanting and then removing the stirring deposit, the solvents are recirculated through the deposit until substantially incorporated into the system. The resultant product, while slightly yellowed in color, is very compact and hard.

Example 4

| | Parts |
|---|---|
| Acetone | 50 |
| Diallyl maleate | 6 |
| Diallyl adipate | 4 |
| Benzoyl peroxide | 1 |
| Vinylite VYHH | 5 |
| Cotton fiber | 3 |

The conditions of handling in Example 2 were followed. The resultant product is apparently equivalent in all respects to that obtained in Example 1.

Example 5

Employing the single solvent, acetone, of Example 4, and using either of 2 resins having different chloride proportions, as for instance Vinylite VYHH and VYHF, a satisfactory material was produced when we compensated for the lowered proportions of diallyl adipate by using appropriate plasticizers.

| | Parts by weight ||
|---|---|---|
| | VYHH System | VYHF System |
| Acetone | 50 | 50 |
| Diallyl maleate | 6 | 6 |
| Diallyl adipate | 2 | 2 |
| Vinyl isopropyl ether | 2 | |
| Phoresin prepolymer | | 2 |
| Benzoyl peroxide | 1 | 1 |
| Vinylite VYHH | 5 | |
| Vinylite VYHF | | 5 |
| Cotton fiber | 3 | 3 |

The resultant products are similar to that in Example 1.

Example 6

Again employing acetone only as a solvent it was found possible to substitute a small quantity of a vinyl plasticizer, chlor ethyl vinyl ether, for the diallyl adipate:

| | Parts by weight |
|---|---|
| Acetone | 50 |
| Diallyl maleate | 6 |
| Chlor ethyl vinyl ether | 1 |
| Benzoyl peroxide | 1 |
| Vinylite VYHF | 5 |
| Cotton fiber | 3 |

The conditions of handling in Example 2 were followed. The resultant product is apparently equivalent in all respects to Example 1.

This invention comprises two processing steps, carried out in one operation. These steps are (1) increasing the surface area of the fibers, and (2) treating the fibers with the resin plus binding agent and impellent.

The step of increasing the surface area of the fibers, that is, swelling the fibers, is preferably carried out as described above. However, it is possible, in a less desirable process, to pre-treat the fibers to swell them, by special swelling agents, organic or inorganic, and which agents are not ingredients of the resin formula.

In one aspect, the process is characterized as one in which a structural material of nearly white color and smooth surface, having a substantially uniform distribution of cotton filler, having dimensional stability, low specific gravity, substantial water-resistance, freedom from warping, and good-tooling characteristics, and having a thickness as low as $\frac{1}{16}''$, is prepared by dissolving a vinyl resin in and dispersing cotton fiber in an organic solvent having a boiling point sufficiently high to permit stirring-in addition of filler and resin at a temperature sufficiently high to cause gelling of resin to take place upon and in the cotton fibers, the cotton being in a swollen condition, gelling action and fiber penetration being aided by cross-linking agents, particularly esters of maleic acid or adipic acid, such as the diallyl esters, formed with cellulose, and aided by an organic peroxide impellent, the progressively gelling resin solution going through a range from low to high gel, the expanded cotton fibers remaining in swollen condition in a uniform dispersion during the progressive gelling, the jell dispersion itself over the surface and into the interstices of the cotton fibers, the gelling thereafter being continued to thermoset the resin by controlled heat and low pressure, without use of a chemical agent for chain length termination.

Having thus described our invention we claim:

1. A process for preparing a structural material comprising: suspending cotton fiber in a solvent mixture of methyl ethyl ketone and acetone containing benzoyl peroxide and diallyl maleate, maintaining said suspension while the fibers markedly swell, stirring in a vinyl acetate-vinyl chloride resin while maintaining a temperature slightly below the normal boiling point of the solvent, the resin solution progressively jelling from a low to a high gel and progressively impregnating the fiber, thereafter removing excess solvent and molding the mixture under pressure and heat, at a temperature not over 100° C.

2. A process for preparing a structural material comprising: suspending cotton fiber in a solvent comprising acetone containing benzoyl peroxide and a member of the group consisting of diallyl maleate and diallyl adipate, maintaining said suspension at a temperature slightly below the boiling point of acetone, while the fibers swell, thereafter stirring in a vinyl acetate-vinyl chloride resin, permitting the resin solution to progressively jell from a low to a high gel and dispose itself over and within the interstices of the fiber, thereafter removing excess solvent and molding the mixture under pressure and heat, at a temperature not over 100° C.

3. A process for preparing a structural material comprising: suspending cotton fiber in an inert liquid ketone solvent for vinyl acetate-vinyl chloride resin, the solvent containing an organic peroxide vinyl resin polymerization catalyst and a cross-linking agent selected from the group consisting of diallyl esters of aliphatic dicarboxylic acids, maintaining said suspension while the fibers assume a swollen state, stirring in vinyl resin into the organic solvent suspension, the fibers being substantially uniformly coated by the resin solution, the resin solution progressively gelling in contact with the fibers, and thereafter removing excess solvent, and molding the mixture under pressure and at a temperature above the boiling point of the solvent and no higher than about 100° C.

4. A process for preparing a structural material comprising: suspending cotton fiber in a liquid ketone solvent for a vinyl acetate resin, the solvent containing an organic peroxide vinyl acetate polymerizing catalyst and a vinyl acetate resin cross-linking agent selected from the class of di-allyl esters of aliphatic dicarboxylic acids, maintaining said suspension while the fibers assume a swollen state, stirring in the vinyl acetate resin into the ketone solvent solution, the fibers being substantially uniformly coated by the resin solution, the resin solution progressively gelling in contact with the fibers, and thereafter removing excess solvent, and molding the mixture under pressure at a temperature above the boiling point of the solvent and no higher than about 100° C., a temperature above room temperature but no higher than the boiling point of the ketone solvent being employed during the swelling of the fibers and the gelling of the resin to accelerate the process.

HIBBARD S. BUSBY.
WENDELL L. WARD.

REFERENCES CITED

The following references are of record in the file of this patent:

UNITED STATES PATENTS

| Number | Name | Date |
|---|---|---|
| 2,155,590 | Garvey | Apr. 25, 1939 |
| 2,255,313 | Ellis | Sept. 9, 1941 |